United States Patent [19]

Cronce et al.

[11] Patent Number: 5,013,081
[45] Date of Patent: May 7, 1991

[54] VEHICLE SPOILER CONSTRUCTION

[75] Inventors: Gary M. Cronce; Ronald W. Reid; Craig A. Stapleton; Robert S. Zauner, all of Port Huron, Mich.

[73] Assignee: Huron/St. Clair Incorporated, Port Huron, Mich.

[21] Appl. No.: 493,084

[22] Filed: Mar. 13, 1990

[51] Int. Cl.5 .......................................... B62D 37/02
[52] U.S. Cl. .................................................. 296/180.1
[58] Field of Search ............. 296/180.1, 180.2, 180.4; 180/903

[56] References Cited

U.S. PATENT DOCUMENTS

| D. 291,978 | 9/1987 | Parr et al. | |
|---|---|---|---|
| 3,596,975 | 8/1971 | Stephen. | |
| 3,799,603 | 3/1974 | Bott. | |
| 3,856,193 | 12/1974 | Bott. | |
| 4,063,773 | 12/1977 | Modesette. | |
| 4,274,670 | 6/1981 | Pitzmann. | |
| 4,339,145 | 7/1982 | Bott et al. | 296/180.1 |
| 4,406,491 | 9/1983 | Forster. | |
| 4,558,898 | 12/1985 | Deaver. | |

FOREIGN PATENT DOCUMENTS

| 3240492 | 5/1984 | Fed. Rep. of Germany | 296/180.1 |
|---|---|---|---|
| 113654 | 5/1987 | Japan | 296/180.1 |
| 43875 | 2/1988 | Japan | 296/180.1 |
| 18785 | 1/1989 | Japan | 296/180.1 |
| 190589 | 7/1989 | Japan | 296/180.1 |

Primary Examiner—Margaret A. Focarino
Assistant Examiner—Gary C. Hoge
Attorney, Agent, or Firm—Edgar A. Zarins; Malcolm L. Sutherland

[57] ABSTRACT

An aerodynamic spoiler construction for a vehicle in which substantially all of the fasteners are hidden from exterior view. The spoiler includes base members secured to the vehicle, supports mounted to the base members and secured to the spoiler cross wing. End fins are received within the ends of the cross wing. The base members are mounted to the vehicle and the supports are attached to the wing by fasteners hidden within the supports. Additional fasteners secure the supports to their respective base members.

11 Claims, 2 Drawing Sheets

VEHICLE SPOILER CONSTRUCTION

BACKGROUND OF THE INVENTION

I. Field of the Invention

This invention relates to an aerodynamic spoiler for a vehicle and, in particular, to a vehicle spoiler construction which facilitates assembly and mounting while eliminating unsightly exposed fasteners.

II. Description of the Prior Art

Aerodynamic spoilers are widely used on vehicles to create a downwardly directed force to compensate for the vehicles tendency to lift under certain operating conditions. Many other spoilers are installed on vehicles to provide a sporty appearance. These spoilers generally function as an inverted airfoil to enhance handling of the vehicle. Such aerodynamic spoilers are generally mounted on a rearward portion of the vehicle and are supported in a vertically spaced relationship to the vehicle surface. The prior spoilers have been manufactured as assembled components or integrally molded for mounting to the vehicle. The integral spoiler constructions have proven to be difficult to efficiently mold while the assembled spoilers leave unsightly fasteners which not only reduce the aesthetic qualities of the spoiler but also have a tendency to corrode due to exposure to the elements.

Summary Of The Present Invention

The present invention overcomes the disadvantages of the prior known vehicle spoiler constructions by providing a spoiler assembled from individual components yet eliminates many of the unsightly fasteners which are exposed to the elements.

The vehicle spoiler construction includes a cross wing and end fins received within the ends of the cross wing to form an aerodynamic foil. Preferably, the cross wing is roll formed of a light metal and has a hollow construction. The end fins are matingly received within the hollow cross wing and secured by fasteners fed through the underside of the wing. The cross wing is attached to a pair of support members by fasteners disposed within the supports and extending through an upper surface to engage the cross wing. As a result the fasteners used to secure the support to the wing are protectively hidden within the supports. To secure the spoiler to the vehicle, a pair of base members are mounted to the vehicle which are matingly received within the bottom of the supports. In this fashion, the fasteners used to secure the bases are hidden within the support. A single set screw is used to prevent separation of the support members from their respective base members.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
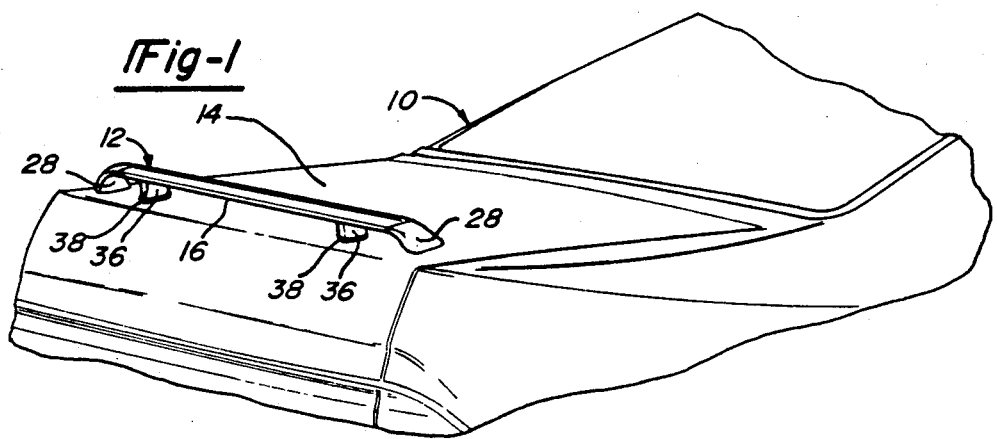
FIG. 1 is an elevated perspective view of a vehicle with the spoiler embodying the present invention mounted thereto.

Referring first to FIG. 1, there is shown a vehicle 10 having the spoiler 12 of the present invention mounted to a rear deck 14 of the vehicle 10. The spoiler 12 is typically mounted to the rearward portion of the vehicle 10 to improve handling and aerodynamics. Alternatively, the spoiler 12 could be mounted to a rearward portion of the roof in utility vehicles such as vans or wagons. The spoiler construction of the present invention lends itself to be easily mounted to substantially any surface of the vehicle.

Figure 2:
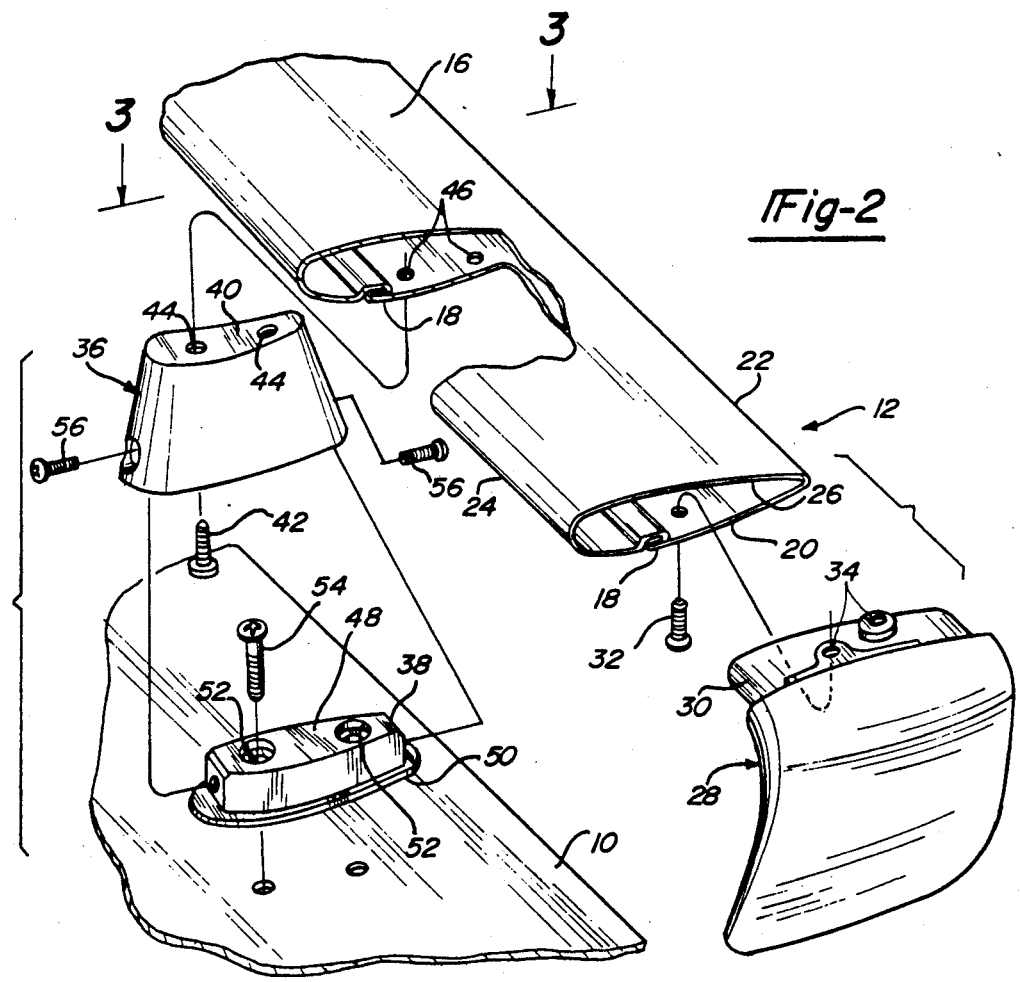
FIG. 2 is an exploded view of the spoiler construction of the present invention.
Figure 3:
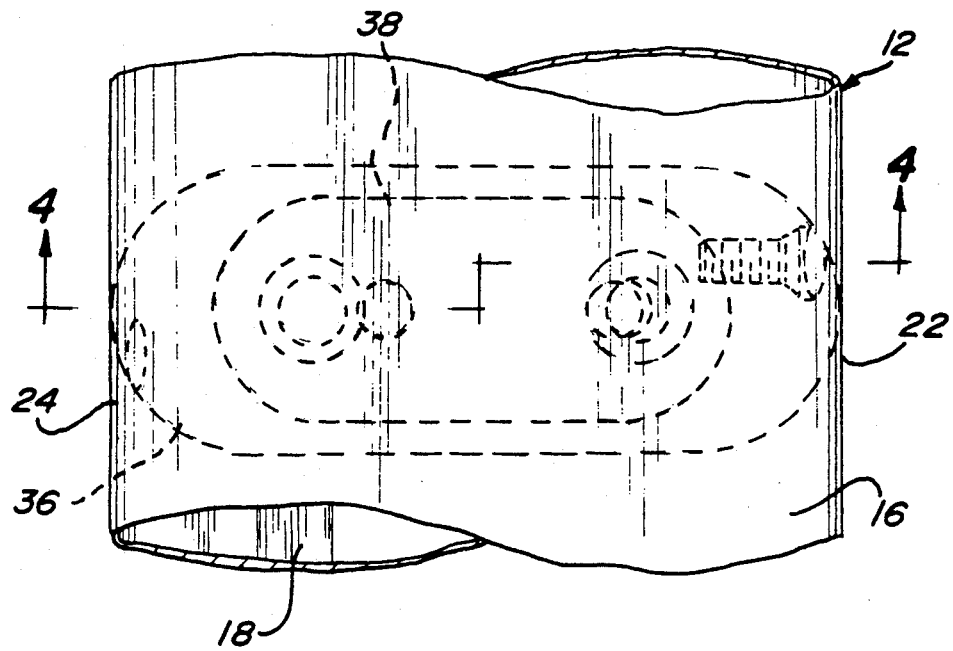
FIG. 3 is a partial top plan view of the spoiler construction taken along lines 3—3 of FIG. 2.
Figure 4:
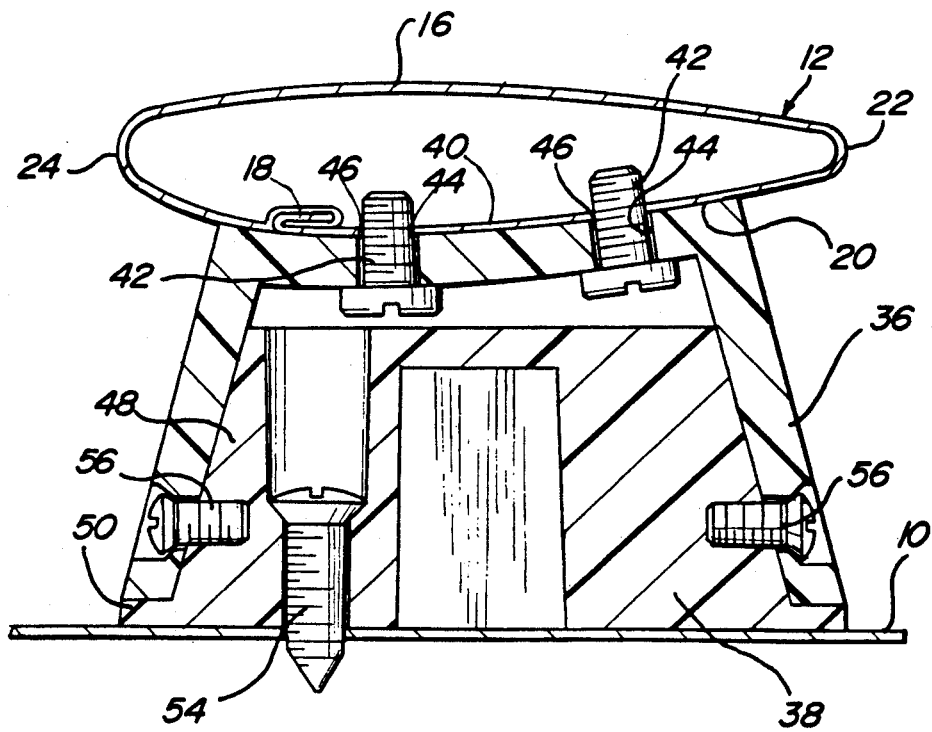
FIG. 4 is a cross-sectional perspective view of the spoiler construction taken along lines 4—4 of FIG. 3.

Referring now primarily to FIGS. 2 through 4, the spoiler 12 of the present invention includes a cross wing 16 forming the aerodynamic body of the spoiler 12. The cross wing 16 preferably has a hollow construction formed through a roll forming process using a lightweight metal. The roll form seam 18 is formed on the underside 20 of the cross wing 16 so as to be substantially hidden from view. The cross wing 16 has a tapered aerodynamic configuration with a front edge 22 which is narrower than the rear edge 24 of the wing 16. End caps are used to enclose the ends 26 of the hollow cross wing 16. In a preferred embodiment, the end members are downwardly directed fins 28 which are matingly received within the cross wing 16. The end fins 28 include a reduced protrubence 30 which is matingly received within the open ends 26 of the cross wing 16. Fasteners 32 extending through the underside 20 of the cross wing 16 engage threaded bores 34 in the end fins 28 to secure the fins 28 within the cross wing 16.

The aerodynamic wing is supported in spaced apart relation to the vehicle surface 14 by a pair of support members 36 mounted to the vehicle 10 through base members 38. The number of supports may be varied although the conventional number of supports is two to support the elongated wing 16. The support members 36 have a substantially oval horizontal cross-section and include a curved seat 40 adapted to receive the underside 20 of the cross wing 16. The supports 36 have a hollow construction to allow fasteners 42 to be passed up through openings 44 formed in the curved upper surface 40. The fasteners 42 are adapted to be retrieved by apertures 46 formed in the underside 20 of the cross wing 16 to secure the supports 36 to the wing 16. As a result, the fasteners 42 are hidden from view and from exposure to the elements yet the supports 36 are securely attached to the wing 16.

The base members 38 are secured directly to the vehicle surface 14 and comprise an upwardly extending boss 48 and a peripheral flange 50 which has a configuration substantially identical to the circumferential configuration of the supports 36. In addition to providing a base for the supports 36, the base members 38, particularly the flange 50, act as insulators between the supports 36 and the vehicle surface 14. Of course, a separate insulator may be provided in place of or in addition to the flange 50 of the base members 38. Vertical throughbores 52 are formed in the base members 38 to receive fasteners 54 utilized to secure the base 38 to the vehicle surface 14. Once the base members 38 are secured to the vehicle 10, the supports 36, which are already attached to the cross wing 16, are mounted to the base members 38. The boss 48 is matingly received within the hollow support 36 and their connection is secured by fasteners 56 extending through the side wall of the supports 36 into the base members 38.

The spoiler construction 12 of the present invention facilitates componentized manufacture of the spoiler 12 while maintaining the necessary structural strength and aesthetic quality. In the preferred embodiment of the spoiler 12, the cross wing 16 is made of roll formed metal while the end fins 28, supports 36 and base members 38 are molded of a durable nylon or plastic material which provides flexibility in the final configuration of the spoiler 12. The components are assembled by attaching end fins 28 within the open ends of the cross wing 16 and securing the supports 36 to the underside 20 of the cross wing 16. Thereafter, the support members 36 are mounted to the base members 38 which have been secured to the vehicle surface 14. The spoiler construction of the present invention provides a lightweight yet durable and economically manufactured spoiler 12 for a vehicle 10.

The foregoing detailed description has been given for clearness of understanding only and no unnecessary limitations should be understood therefrom as some modifications will be obvious to those skilled in the art without departing from the scope and spirit of the appended claims.

We claim:

1. An aerodynamic spoiler adapted to be mounted to a surface of a vehicle, said spoiler comprising:
   at least one base member secured to the vehicle surface using first fasteners extending through said at least one base member into the vehicle surface, said at least one base member including a peripheral flange and a reduced circumference boss;
   a support member mounted to said at least one base member, said support member matingly receiving said boss of said at least one base member, the circumferential configuration of said support member substantially identical to the circumferential configuration of said peripheral flange such that said flange prevents contact between said support member and the vehicle surface
   a substantially hollow elongated body mounted to said support member using second fasteners extending through said support member into said hollow body, said elongated body having open ends; and
   an end cap member matingly received in each of said open ends of said elongated body.

2. The spoiler as defined in claim 1 wherein said support member includes an upper curved surface forming a seat to receive said body, said body having a curved lower surface seatingly cooperating with said upper curved surface of said support member, said upper surface of said support member including at least one aperture through which said second fasteners extend to engage said lower surface of said elongated body.

3. The spoiler as defined in claim 1 wherein said end cap members include a reduced circumference boss matingly received within said ends of said body and an aerodynamic fin, said fin curved downwardly towards the vehicle surface.

4. The spoiler as defined in claim 3 wherein said boss of said end cap member includes a pair of throughbores for receiving third fasteners extending through said lower surface of said body into said throughbores to secure said end cap member within said elongated body.

5. The spoiler as defined in claim 1 wherein said support member is secured to said corresponding base member by fourth fasteners extending through a side wall of said support member and said boss of said base member.

6. The spoiler as defined in claim 3 wherein said elongated body is roll formed of metal.

7. The spoiler as defined in claim 6 wherein said at least one base member, said support members and said end cap members are molded of a nylon material.

8. An aerodynamic spoiler adapted to be mounted to a surface of a vehicle, said spoiler comprising:
   a pair of base members secured to the vehicle surface by first fasteners, said base members including a peripheral flange and a reduced circumference boss, said first fasteners extending through said boss into the vehicle surface;
   a pair of support members mounted to said base members, said support members matingly receiving said boss of said base members and having a circumferential configuration substantially identical to the circumferential configuration of said peripheral flange of said base members such that said flange prevents contact between said support members and the vehicle surface, said support members including an upper surface seat;
   a substantially hollow elongated body mounted to said upper surface seat of said support members by second fasteners extending through said upper surface of said support member into said hollow body, said elongated body having open ends; and
   an end cap member matingly received in each of said open ends of said elongated body, said end cap member including a reduced circumference boss matingly received within said end of said body.

9. The spoiler as defined in claim 8 wherein said end cap members include an aerodynamic fin curved downwardly towards the vehicle surface.

10. The spoiler as defined in claim 8 wherein said hollow body is roll formed of metal, the roll formed seam of said body disposed on the underside of said elongated body.

11. The spoiler as defined in claim 10 wherein said base members, said support members and said end cap members are molded of a nylon material.

* * * * *